United States Patent [19]
Hentzschel et al.

[11] Patent Number: 5,567,272
[45] Date of Patent: Oct. 22, 1996

[54] PROCESS FOR RECYCLING SILICONE-COATED PAPER

[75] Inventors: Peter Hentzschel, Oberursel; Walter Kamutzki, Dieburg; Dieter Wolf, Darmstadt, all of Germany

[73] Assignee: Hoechst Aktiengesellschaft, Frankfurt Am Main, Germany

[21] Appl. No.: 520,165

[22] Filed: Aug. 28, 1995

[30] Foreign Application Priority Data

Sep. 10, 1994 [DE] Germany .......................... 44 32 252.6

[51] Int. Cl.$^6$ .................................. D21H 21/02
[52] U.S. Cl. ........................ 162/9; 162/5; 162/4
[58] Field of Search .................... 162/4, 5, 9, 8

[56] References Cited

U.S. PATENT DOCUMENTS 1,628,931  5/1927  Todd .
5,232,551  8/1993  Hornfeck et al. .

FOREIGN PATENT DOCUMENTS 1175204   10/1984  Canada .
0030057   6/1981   European Pat. Off. .
0587000   3/1994   European Pat. Off. .
4230424A1 3/1994   Germany .......................... D21C 5/02
62021890  7/1985   Japan .
WO9008220 7/1990   WIPO .

Primary Examiner—Donald E. Czaja
Assistant Examiner—Jose A. Fortuna
Attorney, Agent, or Firm—Connolly & Hutz

[57] ABSTRACT

The present invention relates to a process for recycling silicone-coated paper by disintegration and new formation of sheets, which comprises carrying out the disintegration in the presence of one or more salts of monophosphoric esters.

9 Claims, No Drawings

PROCESS FOR RECYCLING SILICONE-COATED PAPER

The present invention relates to a process for recycling silicone-coated paper using salts of monophosphoric esters.

Silicone-coated paper is used as backing paper for adhesive labels, self-adhesive films, self-adhesive tapes or as a release paper for PVC film production. It arises in not inconsiderable amounts both at the manufacturer and also at the processor and, after completing its function as a backing paper or release paper, must be disposed of by landfilling or thermally, i.e. by incineration. Only in exceptional cases have lower-quality papers for packaging purposes been previously produced from these papers.

Re-use of the papers by the conventional recycling processes for printing or packaging papers could hitherto not be carried out without loss in quality of the papers and because of the problems occurring in paper production such as insufficient disintegration of the fibers and sticking of resin particles to rolls and felts. The sheet quality required for the absorption of water-soluble binders in the production of silicone base paper has not been achieved, so that a uniform sealed silicone resin film could not be produced on the silicone base paper produced from recycled material. However, a coherent silicone resin film is absolutely necessary to avoid solvent breakthrough or adhesive breakthrough, since otherwise the abhesive properties of these papers are adversely affected.

Independently of the compulsion for reprocessing silicone-coated papers which is stipulated by law on the basis of waste regulations, there is a great interest on the part of the manufacturer of silicone papers in reprocessing the silicone papers, which are generally produced from high-grade fibrous materials.

There has therefore been no lack of attempts to improve the recyclability of silicone-coated papers by various aids (see, e.g. EP-A 587 000); however, sheet formation was generally extremely defective because of the incomplete dispersion of the fiber bundles. The dispersion of silicone-coated papers at temperatures above 100° C. and with the addition of alkali gave only a slight improvement; the recycled material was not to be used for producing the same type of paper.

The object of the present invention is therefore to develop a process for recycling silicone-coated paper without the said disadvantages such as defective hydrapulping, incomplete resin dispersion, the formation of resin agglomerates and the risk of sticking to cylinder surfaces and felts associated therewith.

This object is surprisingly achieved by a process for recycling silicone-coated paper by disintegration and new formation of sheets, which comprises carrying out the disintegration in the presence of one or more salts of monophosphoric esters.

Such salts are already known and are described for example in WO 90/08220 for reprocessing waste paper without, however, the present problem having been considered therein. The disintegration of the silicone-coated paper can be performed in a conventional laboratory disintegrator, the paper being used at a pulp concentration of 3 to 6% by weight, preferably 5% by weight. On an industrial scale, in particular high consistency pulpers are used which handle pulp concentrations of 15% by weight or more. Generally, the heat released by the mechanical work reinforces the redispersion.

Preferred salts of monophosphoric esters are compounds of the formula I

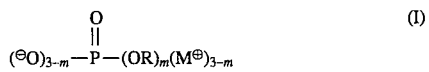

in which

R is $(C_8-C_{18})$-alkyl or $(C_8-C_{18})$-ethoxyalkyl, m is 1 or 2 and

M is hydrogen, ammonium or an alkali metal.

M as alkali metal is, for example, lithium, sodium or potassium, preferably sodium or potassium.

$(C_8-C_{18})$-alkyl and $(C_8-C_{18})$-ethoxyalkyl can be straight-chain or branched. Preference is given to n-octyl, 2-ethylhexyl, n-dodecyl and i-tridecyl. Particular preference is given to n-dodecyl.

The compounds of the formula I preferably have acid numbers (mg of KOH/g) of 200 to 350.

The compounds of the formula I can be used alone or in mixtures with one another. Preferred mixtures comprise two compounds of the formula I which differ only in the number m.

If mixtures of two compounds of the formula I are used, their molar weight ratio is preferably 1:1.

The compounds of the formula I are preferably used in amounts of 0.1 to 2.0% by weight, particularly preferably in an amount of 0.3% by weight, based on silicone-coated paper.

The compounds of the formula I are water-soluble and generally solvent-free.

A pH of 10 to 12 is preferably employed, pH=12 being particularly preferred. If appropriate, the pH must be adjusted by addition of a base, for example 10% strength sodium hydroxide solution.

The temperature is preferably 60° to 80° C., 70° C. being particularly preferred.

Under these conditions, a complete disintegration of the fibers is achieved in the course of 20 to 40 minutes, at a temperature of 70° C. in the course of 30 minutes.

From the fiber suspensions thus obtained, new sheets can be formed in a conventional manner known to those skilled in the art. These sheets have a good homogeneity and a low cloud effect. When the sheets are dried on a felt-covered drying cylinder (surface temperature up to 120° C.) between couch paper, no sticking of the dried papers to the couch paper is observed. Moreover, the saponified silicone resin particles are so well distributed in the newly formed paper sheet that silicone resin can no longer be detected on the sheet surface by means of FT-IR analysis.

Without using a compound of the formula I, in contrast, the sheet formation is unsatisfactory. Agglomerated resin particles collect on the sheet surface and can thus lead to sticking to drying cylinders and felts.

In a preferred embodiment of the process according to the invention, the disintegration is additionally carried out in the presence of a salt of a polyacrylic acid. Suitable salts of polyacrylic acids are commercially available and may be obtained, for example, under the names BASF Polysalz® (registered trademark of BASF AG, Ludwigshafen, Federal Republic of Germany) or Lastaron® (registered trademark of BK Ladenburg GmbH, Ladenburg, Federal Republic of Germany).

A suitable salt is, for example, the sodium salt. The said salts are preferably used in amounts of 0.3 to 0.6% by weight, particularly preferably in an amount of 0.4% by weight, based on silicone-coated paper.

By using the said salts of low molecular weight polyacrylic acids, the dispersion of individual fiber bundles into individual fibers can be optimized.

In a further preferred embodiment of the process according to the invention, a flotation process downstream of the disintegration is provided. This process can be carried out in any flotation-deinking plant and is known per se to those skilled in the art. This process achieves a removal of the silicone resin particles from the fiber suspension or at least a reduction of the silicone resin particles. The fiber loss due to the flotation, at 5 to 10% by weight, based on the weight of the silicone-coated paper used, is small.

The process according to the invention is described in more detail by the following examples:

EXAMPLE 1

100 g of 65 g/m² silicone-coated paper were disintegrated with 1900 ml of water in a 3 l disintegrator at 2800 rpm. The pH of the pulp suspension was adjusted using 10% strength sodium hydroxide solution to a pH of 12 and the temperature of the pulp suspension was adjusted by preheated water to 70° C.

To 100 g parts by weight (dry) of the aqueous fiber suspension thus obtained were added 0.172 part by weight dry weight of a compound of the formula I where R=n-dodecanol, M=sodium as an equimolar mixture of m=1 and m=2 having a solids content of 93% in the form of a dilute, aqueous solution.

After dispersion for 30 minutes, sheets were formed on an automatic sheet former, air-dried and then further dried on a felt-covered drying cylinder for 10 minutes at 105° C. between couch paper.

The sheets, on being looked through, show good sheet formation and are free of adhering resin particles. No silicone resin is detectable by an FT-IR spectrum of the sheet surface. No sticking to couch paper is observed.

Repetition of the above-described procedure but without the use of compounds of the formula I leads to paper having a high cloud effect. Silicone resin is detectable by FT-IR spectroscopy of the sheet surface. The paper sticks to couch paper.

EXAMPLE 2

Silicone-coated paper was disintegrated as in Example 1, but, in addition, from the beginning of the disintegration, 0.4 g of a commercial sodium salt of a polyacrylic acid was added in the form of a 10% strength aqueous solution. The sheets, on being looked through, show very good sheet formation and are free of adhering resin particles.

EXAMPLE 3

Silicone-coated paper is disintegrated as in Example 1. The fiber suspension, after dilution to a pulp concentration of 1%, was then floated in a flotation-deinking cell with addition of 1 g of oleic acid. The temperature during flotation was 40° C. After 10 minutes of treatment, the air feed was shut off. The enriched pulp contains silicone resin in flotated form. As described in Example 1, sheets were formed, dried and studied for sticking and silanol bands. For comparison, the experiment was repeated with twice the amount of compound of the formula I and without addition of a compound of the formula I. The following results were obtained:

| Amount of aid according to Example 1 | Flotation residue [g] | Sticking test | Silanol bands (IR) | |
|---|---|---|---|---|
| | | | after flotation | flotate |
| 0.172 | 3.8 | 2–3 | − | ++ |
| 0.344 | 4.1 | 1–2 | − | + |
| without aid | 3.3 | 2 | + | ++ |

In the sticking test:
1=does not stick
to
4=sticks markedly
in the silanol bands:
++ is detectable intensely
+ is detectable
− is not detectable

We claim:

1. In a process of recycling silicone-coated paper by disintegration and the formation of new sheets of paper, the improvement comprising carrying out the disintegration in the presence of one or more salts of monophosphoric esters having the formula I

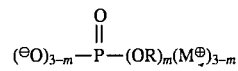

in which

R is $(C_8-C_{18})$-alkyl or $(C_8-C_{18})$-ethoxyalkyl;

m is 1 or 2; and

M is hydrogen, ammonium or an alkali metal.

2. The process as claimed in claim 1, wherein R is n-octyl, 2-ethylhexyl, n-dodecyl or i-tridecyl.

3. The process as claimed in claim 1, wherein the disintegration is carried out at a pH of 10 to 12.

4. The process as claimed in claim 1, wherein the disintegration is additionally carried out in the presence of a salt of a polyacrylic acid.

5. The process as claimed in claim 1, additionally comprising a flotation process downstream of the disintegration.

6. The process as claimed in claim 1, wherein the salts of monophosphoric esters are used in amounts of 0.1 to 2.0% by weight based on silicone-coated paper.

7. The process of claim 6 wherein the salts are used in amounts of 0.3% by weight.

8. The process as claimed in claim 1, wherein the disintegration is carried out at a temperature of 60° to 80° C.

9. The process of claim 8, wherein the process is carried out at a temperature of 70° C.

* * * * *